United States Patent
Yilmaz et al.

(10) Patent No.: US 10,536,913 B2
(45) Date of Patent: Jan. 14, 2020

(54) METHODS AND DEVICE FOR IMPROVED CELL SYNCHRONIZATION

(71) Applicant: Telefonaktiebolaget LM Ericsson (publ), Stockholm (SE)

(72) Inventors: Osman Nuri Can Yilmaz, Espoo (FI); Erik Eriksson, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 15/547,694

(22) PCT Filed: Mar. 6, 2015

(86) PCT No.: PCT/SE2015/050256
§ 371 (c)(1),
(2) Date: Jul. 31, 2017

(87) PCT Pub. No.: WO2016/144214
PCT Pub. Date: Sep. 15, 2016

(65) Prior Publication Data
US 2018/0020415 A1 Jan. 18, 2018

(51) Int. Cl.
*H04W 56/00* (2009.01)
*H04W 48/16* (2009.01)
(Continued)

(52) U.S. Cl.
CPC ....... *H04W 56/0015* (2013.01); *H04W 48/16* (2013.01); *H04W 56/001* (2013.01);
(Continued)

(58) Field of Classification Search
CPC ............. H04W 56/00; H04W 56/0015; H04W 56/0085
(Continued)

(56) References Cited

U.S. PATENT DOCUMENTS 7,050,466 B1 * 5/2006 Sung .................... H04B 1/7075
370/503
8,831,119 B2 9/2014 Kang et al.
(Continued)

FOREIGN PATENT DOCUMENTS

WO  WO 2014/017765  1/2014
WO  WO 2014/071562  5/2014

OTHER PUBLICATIONS

Vadada, H., "LTE PCI Planning," XP002742658; Sep. 2010, retrieved from the internet (retrieved on Jul. 22, 2015).
(Continued)

*Primary Examiner* — Jae Y Lee
*Assistant Examiner* — Jean F Voltaire
(74) *Attorney, Agent, or Firm* — Sage Patent Group

(57) ABSTRACT

The present disclosure relates to methods and devices for improved cell detection. In particular the disclosure relates to cell detection within a group of cells with high requirements of low latency. The disclosure also relates to corresponding computer program. The disclosure proposes a method, performed in a wireless device, for cell detection within a group of cells. The method comprises detecting a first synchronization signal of a first cell in the group, wherein the detecting comprises searching for any of a set of predefined synchronization signals. The method further comprises obtaining, based on the detected first synchronization signal, information defining a subset of the predefined synchronization signals, wherein the subset defines synchronization signals that are possible within the group of cells. The method also comprises decoding one or more further synchronization signals of cells in the group of cells using the obtained information.

17 Claims, 7 Drawing Sheets

(51) Int. Cl.
    *H04L 5/00*           (2006.01)
    *H04L 27/26*        (2006.01)
    *H04B 1/7075*      (2011.01)

(52) U.S. Cl.
    CPC .......... *H04B 1/7075* (2013.01); *H04L 5/0007* (2013.01); *H04L 5/0053* (2013.01); *H04L 27/2613* (2013.01); *H04W 56/0085* (2013.01)

(58) Field of Classification Search
    USPC ......................................................... 370/328
    See application file for complete search history.

(56) References Cited

U.S. PATENT DOCUMENTS

| | | | |
|---|---|---|---|
| 9,374,795 B2 | 6/2016 | Hwang et al. | |
| 2008/0043702 A1* | 2/2008 | Moon | H04J 11/0069 370/342 |
| 2010/0177726 A1 | 7/2010 | Olszewski | |
| 2011/0026413 A1* | 2/2011 | Swarts | H04J 11/0073 370/252 |
| 2011/0317780 A1* | 12/2011 | Kang | H04L 5/0007 375/260 |
| 2012/0257513 A1* | 10/2012 | Yamada | H04L 1/0618 370/248 |
| 2013/0142291 A1* | 6/2013 | Dinan | H04L 27/2666 375/343 |
| 2014/0126568 A1* | 5/2014 | Berggren | H04W 56/0015 370/350 |
| 2015/0181543 A1* | 6/2015 | Hwang | H04W 56/002 370/336 |
| 2015/0189574 A1* | 7/2015 | Ng | H04W 24/08 370/252 |
| 2015/0215883 A1* | 7/2015 | Zheng | H04W 52/30 455/426.1 |

OTHER PUBLICATIONS www.telecom-cloud.net/wp-content/uploads/2010/09/PCT-Planning-for-LTE.pdf [retrieved on Jul. 22, 2015].
International Search Report and Written Opinion of the International Searching Authority, Application No. PCT/SE2015/050256, 15 pages.

\* cited by examiner

METHODS AND DEVICE FOR IMPROVED CELL SYNCHRONIZATION

CROSS REFERENCE TO RELATED APPLICATIONS

This application is a 35 U.S.C. § 371 national stage application of PCT International Application No. PCT/SE2015/050256, filed on Mar. 6, 2015, the disclosure and content of which is incorporated by reference herein in its entirety.

TECHNICAL FIELD

The present disclosure relates to methods and devices for improved cell synchronization. In particular the disclosure relates to cell synchronization within a group of cells. The disclosure also relates to corresponding computer programs.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or user equipment units, UEs, communicate via a radio access network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

In order to support high data rates, LTE allows for a system bandwidth of 20 MHz, or up to 100 MHz when carrier aggregation is employed. LTE is also able to operate in different frequency bands and can operate in at least Frequency Division Duplex, FDD and Time Division Duplex, TDD, modes.

The rapid evolution of wireless technologies has dramatically changed the way we communicate and interact with our environment. The next generation radio communication system, i.e., the fifth generation, 5G, takes it even one step further by connecting not only individuals but also all sorts of machines in real time. Especially, the expansion of machine-type communication, MTC, toward industrial applications is seen as one of the key differentiators of 5G.

The requirements on connectivity for industrial applications are very diverse and largely depend on the use case of an industrial application to be operated. Therefore, different Critical-MTC, C-MTC, i.e. ultra-reliable MTC, solutions will be needed under the same 5G umbrella network, as illustrated in FIG. 1. The dashed ellipse in FIG. 1 illustrates a subset of 5G design targets that an industrial application can take advantage of, including 10 to 100 times higher number of connected devices, about 5 times reduced end-to-end latency and a higher degree of availability with respect to today's wireless networks.

Besides the end-to-end latency, which refers to the time taken for a packet to be transmitted across a network from source to destination, the Critical-MTC concept should address the design trade-offs regarding transmission reliability, mobility, energy-efficiency, system capacity and deployment, and provide solutions for how to design a wireless network in a resource and energy efficient way while enabling ultra-reliable communication. As a consequence, to reach the design targets of C-MTC, it is essential to provide faster cell detection and thereby also faster cell access.

To detect a cell in LTE, a UE first needs to synchronize with the cell. To enable cell synchronization, the UE has to decode the Physical Cell Identity, PCI, and the radio frame timing of the cell. Then, the UE will be able to read the system information elements necessary for cell detection. To synchronize with a cell, the UE tunes its radio to a specific supported band or channel. Each cell has a primary synchronization signal, PSS, and a secondary synchronization signal, SSS, located at the center of each band. The UE then synchronizes with the cell by performing the following steps.

In a first step, the UE detects the primary synchronization signal, PSS, that is located in orthogonal frequency-division multiplexing, OFDM, symbol #6 of subframe #0, in each LTE frame. The PSS is repeated every $5^{th}$ ms and is thus repeated in sub frame #5 (in the same OFDM symbol). Hence, after reading the PSS, the UE is synchronized with the cell on a 5 ms basis. With the help of PSS, the UE is able to obtain the physical layer identity, 0 to 2, using non-coherent detection.

In a second step, the UE finds the secondary synchronization signal, SSS, that is located in the same sub frames as the PSS, but in the OFDM symbols before the PSS. With the help of SSS, the UE is able to obtain the physical layer cell identity group number, 0 to 167, using coherent detection. When physical layer identity and cell identity group numbers are detected, the UE knows the exact PCI of the cell.

Hence, in LTE totally 504 PCIs are allowed and are divided into unique 168 cell layer identity groups where each group consist of three physical layer identities. As mentioned above, the UE detects the physical layer identity from the PSS and the physical layer cell identity group from the SSS. In one example, the physical layer identity is 2 and the cell identity group is 4. Then PCI=3*(Physical layer cell identity group)+physical layer identity=3*4+2=14. Once the UE knows the PCI, it also knows the location of the reference signals that are used in channel estimation, cell selection/reselection and handover procedures. Thus, the UE can proceed and access the cell.

Hence, in practice cell synchronization in the current LTE solution could be performed by decoding 2 OFDM symbols that are transmitted on a 5 ms basis, if a match is immediately found when trying to detect the PSS and SSS. However, due to e.g. bad signal properties this is not always possible and the actual detection time is generally much longer.

Thus, there is a need to provide continuous synchronization between UEs and base stations for reliable communication, in particular for mobile critical MTC wireless devices. There is also a need to reduce the time for cell detection and cell access to fulfil the requirements of low latency. Hence, there is a need for improved cell detection methods and arrangements.

SUMMARY

An object of the present disclosure is to provide methods and devices which seek to mitigate, alleviate, or eliminate one or more of the above-identified deficiencies in the art and disadvantages singly or in any combination and to provide improved cell detection.

One embodiment provides a method, performed in a wireless device, for cell detection within a group of cells. The method comprises detecting a first synchronization signal of a first cell in the group, wherein the detecting comprises searching for any of a set of predefined synchronization signals. The method further comprises obtaining, based on the detected first synchronization signal, information defining a subset of the predefined synchronization signals, wherein the subset defines synchronization signals that are possible within the group of cells. The method also comprises decoding one or more further synchronization signals of cells in the group of cells using the obtained information.

By using the proposed technique, cell detection efforts may be reduced compared to prior art methods. Following a first synchronization only a subset of predefined synchronization signals, and not all predefined synchronization signals, needs to be decoded. An additional advantage is improved mobility robustness since latency is reduced due to faster synchronization and because the subset of synchronization signals can be arranged such that the signals within the subset are more easily distinguishable from one another than signals within other groups. A beneficial consequence is that the power consumption for the wireless device can be reduced in a network sharing a frequency resource with other networks, e.g. since the wireless device does not have to read system information to discover that some cells belong to a different network.

According to an aspect, the decoding of one or more further synchronization signals comprises searching for any of the possible synchronization signals. Because the blind decoding synchronization signal space is narrowed down to the subset, the search is resulting in lower latency compared to prior art methods.

According to an aspect, the subset only comprises synchronization signals having correlation properties below a predefined threshold. By reducing synchronization signal space to a subset of synchronization channels having low correlation, the associated decoding effort is reduced. Typically, decoding decisions may be based on fewer symbol samples. Furthermore, decoding reliability may improve in a given area.

According to an aspect, the information defines synchronization signals used by cells in the group. Hence, only synchronization signals that are used need to be searched. Thereby, synchronization signals that are not used are also not searched. A further advantage is possibly that the wireless device power consumption is reduced. A yet further advantage is a lower latency.

According to an aspect, the information defines synchronization signals that the cells in the group are allowed to use. Then the blind decoding synchronization signal space may be narrowed down, because synchronization signals that are not allowed are not searched, resulting in lower latency compared to prior art methods.

According to an aspect, the obtaining comprises receiving information transmitted from a network node in the first cell. Thereby, the wireless device can be informed about synchronization signals that are used within a specific network. This reduces latency for cell re-selection.

According to an aspect, the obtaining comprises obtaining information stored in the wireless device. This aspect enables information about possible synchronization signals to be obtained implicitly by the wireless device, without any signaling overhead.

According to an aspect, the group consists of cells located within an area. Thereby, cell synchronization for wireless devices within an area can be improved.

According to an aspect, the group consists of cells operated by one or more predefined operators. Thereby, in a network where a frequency resource is shared with other networks, the wireless device can immediately discard cells from other operators and does not have to read system information to discover that some cells belong to a different network, thereby improving latency and power consumption of the wireless device.

According to an aspect, the group consists of cells providing one or more predefined services. An advantage is that cell synchronization latency may be reduced for wireless devices using said one or more predefined services, because the wireless device may discards cell that do not provide the desired service.

According to some aspects, the disclosure relates to a network node defining a first cell and configured for cell detection within a group of cells. The network node comprises a communication interface configured for communication with a wireless device. The network node further comprises processing circuitry. The processing circuitry is configured to obtain information defining a set of possible synchronization signals of cells in the group and to transmit the obtained information in the first cell.

The present disclosure also relates to methods of assisting cell detection in a group of cells, wherein each method of assisting cell detection in a group of cells is performed in a network node and assists devices performing cell detection according to an aspect of the disclosed method for cell detection within a group of cells, with all the advantages described above in relation to the disclosed method for cell detection within a group of cells.

According to some aspects, the disclosure relates to a network node defining a first cell in a group of cells. The network node is configured for assisting cell detection in the group of cells. The network node comprises a communication interface configured for communication with a wireless device. The network node comprises processing circuitry configured to cause the network node to obtain information defining a set of possible synchronization signals of cells in the group, and to transmit the obtained information in the first cell.

The present disclosure also relates to network nodes implementing aspects of the disclosed method for assisting cell detection in a group of cells, with all the advantages described above in relation to the disclosed method for cell detection within a group of cells. The disclosure also relates to corresponding computer programs.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
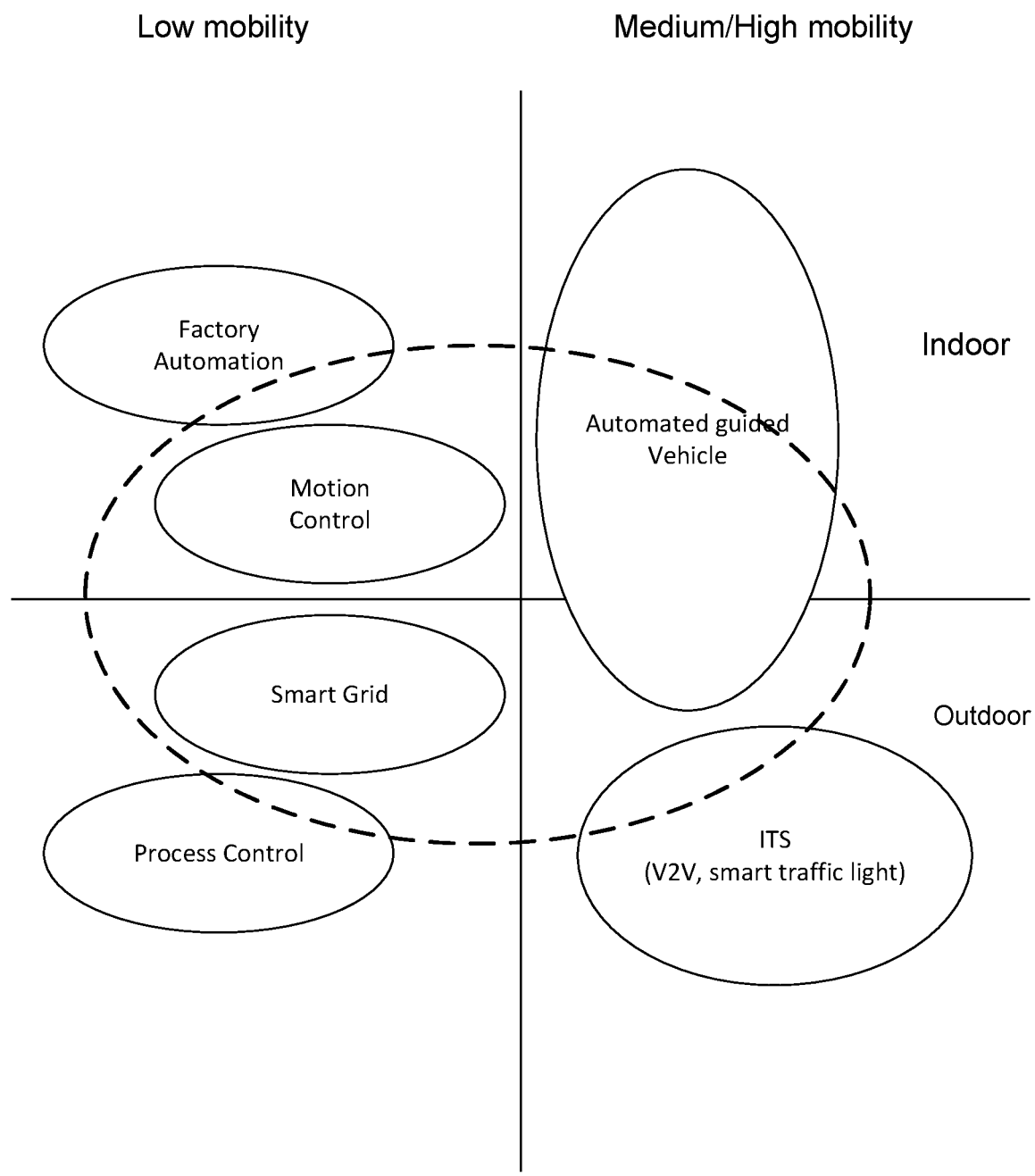
FIG. 1 illustrates industrial use cases and their corresponding attributes and requirements.

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

As stated above, the actual time needed for cell synchronisation is generally much longer than the length of the synchronisation signals that needs to be detected.

The reason is e.g. that if signal quality is low, the detection of the synchronization signals may require combining the decoding results from several subsequent symbols in order to determine a match. In LTE the symbols carrying the synchronization signals are repeated every $5^{th}$ ms. A large number of possible synchronisation signals may imply an increased need for combining these symbols over time and thereby increased detection time.

To explain this further, for each received symbol, one decoding hypothesis can be made for each possible synchronisation signal. The hypothesis reflects the match between the synchronisation signal and the received signal. It may e.g. be a value between 0 and 1 wherein 1 corresponds to full match (or correlation) and 0 corresponds to no correlation.

However, depending on the number of possible synchronisation signals, and on the correlation properties of the different possible synchronisation signals, it may be difficult to make a decision on which is the correct hypothesis, based on the hypotheses calculated from one single received symbol, because there may be several similar hypotheses. The reason is that the received signal is affected by interference, which is varying over time. Hence, to be able to differentiate a large number of possible PCI values that the UE may need to detect, the UE may need to average hypotheses over many symbols to be able to detect the synchronisation signal.

The proposed technique is based on the realization that, if the number of possible synchronisation signals that a wireless device needs to search for is reduced, then the detection time may also be reduced. Therefore, this disclosure proposes a way to reduce the cell detection time by limiting the number of possible synchronisation signals in certain situations.

This is achieved by improved cell detection, wherein cells, and thereby also corresponding synchronization signals, such as physical cell identity (PCI) values, are grouped. The technique may typically be used in critical machine-type communication networks.

Thus, in this disclosure, a PCI group is a limited number of PCI values that are used by a corresponding group of cells. The grouping is e.g. based on the location of the cells, such that adjacent cells belong to the same group. For example one C-MTC network (e.g., in a factory or factory floor or a restricted area in a harbor) consists of one group of cells. During initial access to the network, signals from a full range (typically all 504 possible PCI:s) of synchronization signals will typically be decoded or searched. Decoding of the full range of possible synchronization signals is referred to as blind decoding. A blind, and thereby more time consuming decoding, is considered tolerable at the initial access, because it is only performed once.

The disclosure proposes that at the initial access to a cell in a group of cells, a subset of synchronization signals that are possible within the group is obtained or defined. Thereby, subsequent cell detection attempts, within the group of cells, may use information about the subset to improve cell detection. For example, after a successful PCI reading (and cell synchronization thereof) at the initial network access, the UE can acquire information, which narrows down the synchronization search space for blind decoding. In other words this implies that for further cell detections attempts within the same group, the number of synchronization signals that the wireless device needs to search for is reduced. The information is e.g. information defining a subset of the full synchronization search space that is used in the group to which the cell belongs. Hence, further cell detection operations, such as cell re-selection, then only need to consider the subset of the synchronization signals comprised in the PCI group, thereby possibly decreasing the time needed for cell detection.

The information about the reduced synchronization signal space (in the LTE example referred to as PCI group information) can be either explicitly or implicitly acquired at the initial access to the network. One example of implicit acquiring is that the PCI are grouped in pre-defined groups. Then, by detecting the PCI of one of the cells in the group, the PCI group can be identified, whereby all the possible PCI values are known. Alternatively, the cell may broadcast explicit information to the device about the PCI values used in the group to which the cell belongs.

Another factor that may affect the detection is the correlation between the possible synchronisation signals. "Good" correlation properties may also reduce the need for averaging.

In order to obtain "good" correlation properties within such groups, cell planning is required. Good correlation properties would in this context imply that the synchronization signals within the group are easily distinguishable from one another. The document Vadada 2010 Telecom-cloud (2010) LTE PCI Planning (retrieved from http://www.telecom-cloud.net/wp-content/uploads/2010/09/PCI-Planning-for-LTE.pdf) relates to planning of physical cell identity, PCI, implementation within the Long-Term Evolution, LTE, standard for wireless communication. It describes how PCI is currently implemented within LTE and suggests a strategy aimed at avoiding non-optimal PCI combinations for adjacent cells. The strategy suggests that neighboring sites are grouped into clusters and that each cluster is assigned a limited number of Code Groups, wherein a Code Group is an index in the range of 0-167. Each site is assigned a specific Code Group and each sector a specific Color Group, wherein a Color Group is an index in the range of 0-2. Vadada 2010 further suggests a set of priority orders when planning PCIs. Hence, it is possible to group PCI values such that signals indicating the PCI values from the same PCI group have good correlation properties and are easily distinguishable from one-another, whereas the signals indicating the PCI values from different PCI groups have rather less strict requirements to provide good correlation properties (with respect to the ones from the same PCI group).

As described above, the disclosure proposes that for further attempts to access the C-MTC network, the blind decoding synchronization signal space is narrowed down for the UE by means of acquired PCI group information so that the decoding effort is minimized and/or the decoding reliability is improved in a given (mobility) area. If cell planning is done as suggested in Vadada 2010, the decoding effort will thus be even further reduced within each subset of synchronization signals, as no correlated synchronization signals are used in adjacent cells. Hence, more simple filters or detection algorithms may be used as the signals within the groups are more easily distinguishable.

Figure 2A:
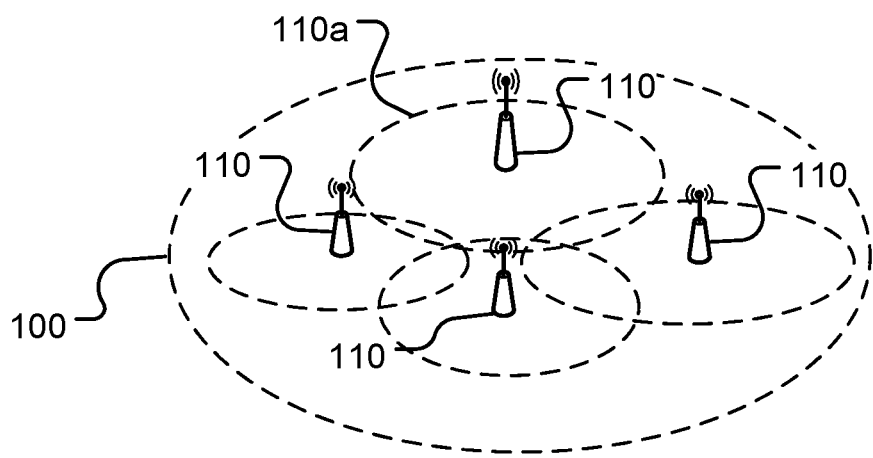
FIG. 2a illustrates an example group of cells.

FIG. 2a illustrates an example group of cells 100, where the proposed methods may be implemented. In this example the group is an area comprising four cells 110a. Each cell is served by a network node 110. The area e.g. corresponds to a factory or factory floor or a restricted area in a harbor.

Figure 2B:
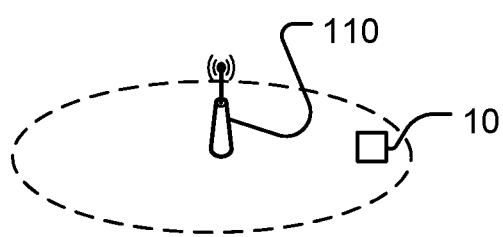
FIG. 2b illustrates an example wireless device in a cell of a network node.

FIG. 2b illustrates one of the cells 110a comprising a wireless device 10. The proposed method is performed when the wireless device makes an initial attempt to access to one of the cells in the group of cells 100.

Figure 3:
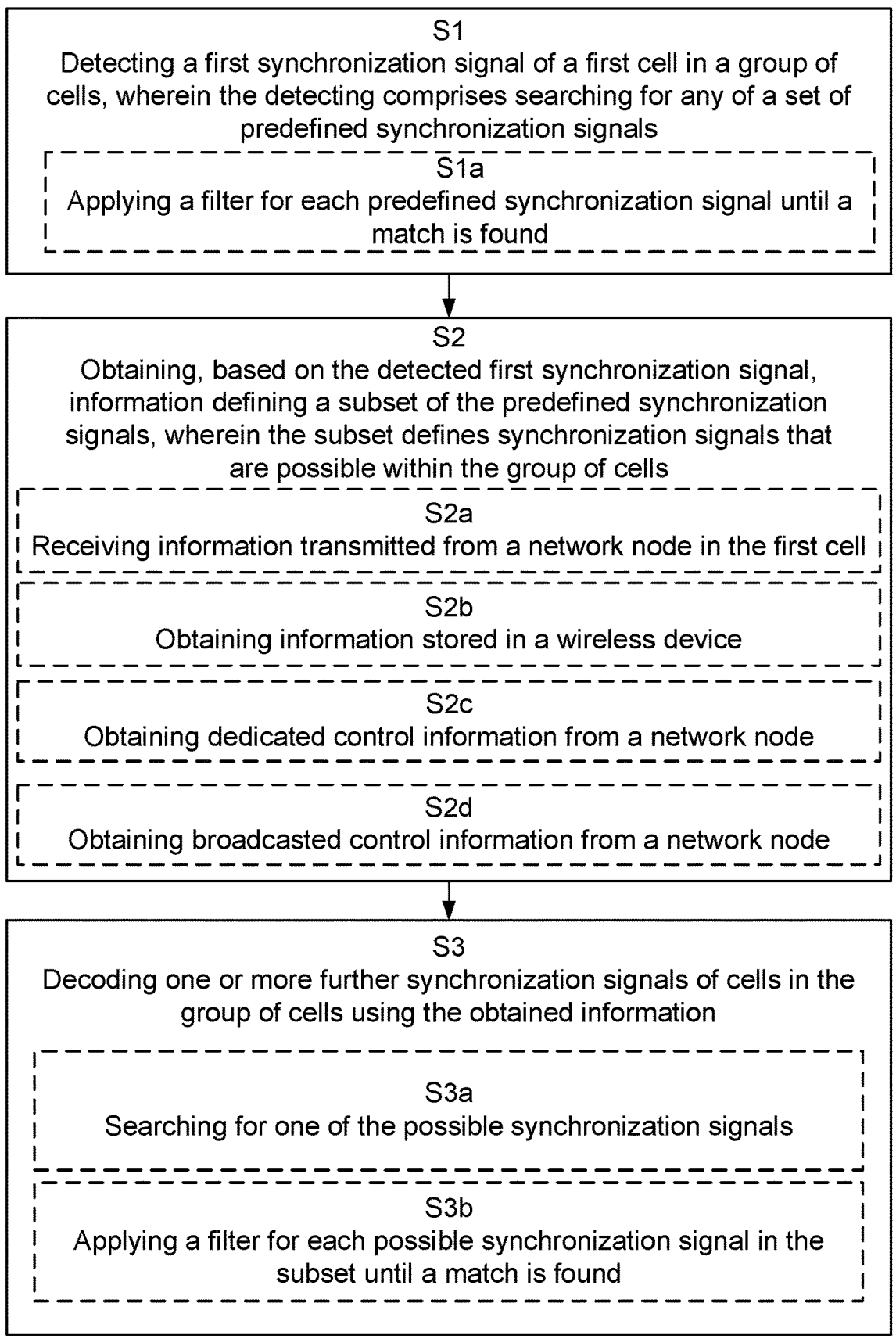
FIG. 3 is a flowchart illustrating embodiments of method steps for cell detection within a group of cells.

A method, performed in a wireless device 10, for cell detection within a group 100 of cells is now described referring to FIG. 3. The method is performed by a wireless device, in LTE referred to as a UE, that is about to access the network node 110 for the first time. In LTE, the network node would be referred to as an eNodeB. The system shown in FIGS. 2a and 2b is a typical example where the method can be implemented. Note that although LTE is used herein as an example, the same principle may be used in other cellular systems where cell synchronization is performed in a group of cells, in particular in a 5G network.

It should be appreciated that FIG. 3 comprises some operations and modules which are illustrated with a solid border and some operations which are illustrated with a dashed border. The operations and modules which are illustrated with solid border are operations which are comprised in a more general example embodiment. The operations and modules which are illustrated with dashed border are example embodiments which may be comprised in, or a part of, or are further embodiments which may be taken in addition to the operations and modules of the general example embodiments. It should be appreciated that the operations need not be performed in order.

The term synchronization signal is in this invention used as a general term meaning indexing signals or discovery signals used for cell detection in a radio network. A synchronization signal may for example be, or comprise, the physical cell identity, PCI, in LTE but can also be other signals such as scrambling code or new discovery signals indicated for LTE, 5G or other standards.

At the initial access to and/or camping on a cell in the group 100, the UE 10 may decode the cell synchronization signals with rather relaxed requirements in terms of time to decode PCI and other related cell information thereof (e.g. reference symbol pattern). Hence, in an initial step, the method comprises detecting, step S1, a first synchronization signal of a first cell 110a in the group 100. The detecting S1 implies searching for any of a set of predefined synchronization signals. The predefined synchronization signals are e.g. all possible PCI values. The predefined synchronization signals are also referred to as a synchronization signal space for blind decoding. Several blind decoding attempts may be acceptable at the first-time access to a cell in the group, if there are detectable signals from the neighboring factory floors formed with different PCI group(s) than the local C-MTC cells. Decoding typically involves filtering or correlating the sampled signal with different known synchronization signals, and averaging over subsequent sub frames in time, until a match is found as discussed above.

The proposed method further comprises obtaining S2, based on the detected first synchronization signal, information defining a subset of the predefined synchronization signals, wherein the subset defines synchronization signals that are possible within the group 100 of cells. In other words, when the wireless device has detected a first synchronization signal, it acquires information about other synchronization signals in the group of cells. A synchronization signal is typically a code or symbol sequence that may be used by a wireless terminal for synchronization with a network.

For example, after a successful PCI reading and cell synchronization at the initial network access, the UE acquires PCI group information which narrows down the synchronization signal space. The PCI group information is information relating to the PCI values in a group of cells. The information may explicitly define the PCI values used or it may identify one of several pre-defined groups of PCI values that are used or allowed in the group.

In other words, after receiving PCI group information, the wireless device needs to search for fewer possible synchronization signals. Thus, the synchronisation time may be reduced. The information on the (PCI) synchronization signal space can be either explicitly or implicitly acquired at the initial access/camping to the network. After this step, the wireless device is synchronized with the network.

However, there may be further needs for synchronization within the group of cells e.g. performed when a wireless device is powered (on after having been powered off), network failure or at cell re-selection when the wireless device 10 is moving within the group of cells. At the next synchronization attempt, the wireless device decodes, step S3, one or further synchronization signals of cells in the group 100 of cells using the obtained information. According to some aspects, the decoding S3 of one or more further synchronization signals comprises searching S3a for any of the possible synchronization signals. After the initial access/camping to a network of a UE, wherein a successful PCI reading, and cell synchronization thereof, has been performed, the UE can acquire the PCI group information which narrows down the synchronization signal space, i.e. said one or more further synchronization signals. Blind decoding, i.e. decoding S3 comprising searching S3a, is then performed over the narrowed signal space. Stated differently, except for the first-time access to C-MTC network (e.g., initial camping), the blind decoding synchronization signal space is narrowed down for the UE by means of acquired PCI group information so that the decoding effort is minimized and/or the decoding reliability is improved in a given group of cells.

According to some aspects, the subset only comprises synchronization signals having correlation properties below a predefined threshold. For example, the cross-correlation between synchronization signals in a group of cells should be below a threshold. The requirement may also apply to the cross-correlation of time shifted versions of the synchronization signals. This implies that, if cell planning is implemented as discussed above, the detection complexity can be further reduced in comparison to the first-time access to the C-MTC network by grouping PCI values such that signals, e.g., root sequences, indicating the PCI values from the same PCI group have good correlation properties and are easily distinguishable from one-another, e.g., using matching filters. In other words, two signals from different groups do not need to have as good correlation properties as two signals within the same group. Thereby decoding time may be reduced as the detection may be based on fewer averaged samples.

According to some aspects, the obtaining S2 comprises receiving S2a information transmitted from a network node 110 in the first cell 110a. This implies that after successful cell synchronization and connection establishment at the initial network access, the cell to which the UE is connected, explicitly informs the UE about the narrowed down synchronization signal space by means of either broadcast information or dedicated signaling. Dedicated signaling is signaling directed to a specific mobile device.

The information may either identify explicit synchronisation signals or it may identify one or more pre-defined groups of synchronisation signals that are possible in the group of cells. The group of cells is e.g. a C-MTC network e.g., in a harbor. This embodiment would be a preferable alternative when the UE has a rather larger mobility or service area where the device may access cells that are from different PCI groups e.g., if the UE is an automated guided vehicle.

Hence, according to some aspects, the obtaining S2 comprises obtaining S2c dedicated control information from a network node. According to some aspects, the obtaining S2 comprises obtaining S2d broadcasted control information from a network node.

According to some aspects, the obtaining S2 comprises obtaining S2b information stored in the wireless device 10. In other words, the information may be implicitly obtained by the UE, without receiving explicit broadcast (system) information or dedicated signaling from the synchronized cell related to the group of synchronization signals. For example a number of groupings of synchronization signals may be pre-programmed or standardized. Then by knowing one synchronization signal in the group, the other synchronization signals allowed to use in the group of cells are implicitly known. The acquired synchronization signal of the first cell implicitly indicates that the synchronization signals of the other cells, which are deployed within the same group of cells (e.g., factory or factory floor), are selected from a certain range/group of synchronization signals. This embodiment would be a good alternative provided that the UE has a restricted mobility or service area.

According to some aspects, the information defines synchronization signals used by cells in the group 100. This alternative is possible if the information is signaled from the network. The network node 110 to which the wireless device has initially synchronized may have knowledge about the synchronization signals used by adjacent cells. Then the wireless device may explicitly search for only the synchronization signals actually being in use.

Examples of synchronization signals in LTE are the primary synchronization signal, PSS, and the secondary synchronization signal, SSS. The primary synchronization signal, PSS, is based on a frequency-domain Zadoff-Chu sequence. The PSS is a sequence of complex symbols, 62 symbols long. Hence, by definition each synchronization signal comprises one or more codes or symbol sequence.

Hence, by using the proposed technique, the detection complexity is moved to the first-time access to the C-MTC network by grouping, based on a first filtering, PCI values such that signals, e.g., root sequences, indicating the PCI values from the same PCI group have good correlation properties, wherein they are easily distinguished from one-another by using matching filters. According to some aspects, the decoding S1 of the first synchronization signal comprises applying S1a a filter for each predefined synchronization signal until a match is found and wherein the decoding S3 of further synchronization signals comprises applying S3b a filter for each possible synchronization signal in the subset until a match is found.

According to some aspects, the group 100 consists of cells located within an area. This implies that the acquired synchronization signals indicate that the cells are deployed within/around the same area. According to an aspect, the area is a factory or factory floor. This embodiment would be a preferable alternative provided that the UE has a restricted mobility or service area.

According to some aspects, the group 100 consists of cells operated by one or more predefined operators. This implies that synchronization signal restriction is used in a network where a frequency resource is shared with other networks. The synchronization signal restriction can then improve UE power consumption and latency by not having to read system information to discover that some cells belong to a network operated by a different operator. According to some aspects, the group 100 relates to cells providing one or more predefined services. By grouping cells providing certain services, a wireless device requiring a specific service may ignore or discard cells not providing the service. Hence, it will only try to synchronize with cells in the group corresponding to a required service.

Figure 4:
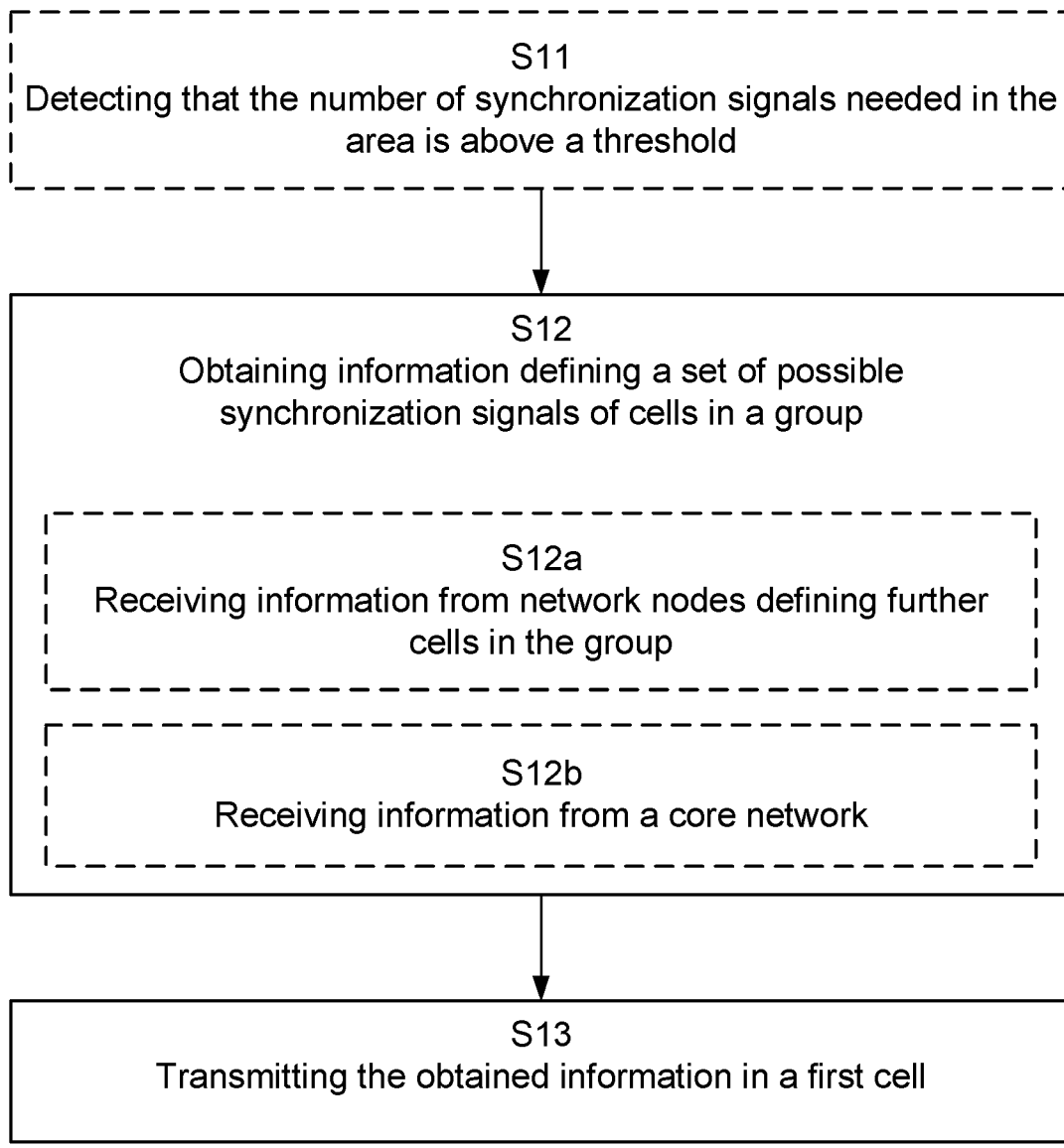
FIG. 4 is a flowchart illustrating embodiments of method steps for assisting cell detection in a group of cells.

A corresponding method performed in a network node 110 of assisting cell detection in a group 100 of cells, will now be described referring to FIG. 4. The method is performed in a network node 110 defining a first cell 110a in the group 100 of cells. The method is performed by a network node in order to inform the wireless device about possible synchronization signals of cells in a group of cells.

In some embodiments of the disclosure, the implicit obtaining as discussed above may be used as a default option. However, then the number of synchronization signals within a group or range may run out. Then the network node may start to signal information defining further possible synchronization signals. In other words the range group may be extended. Accordingly, this may trigger the network node to proceed with the following steps of obtaining S12 and transmitting S13 information defining a set of possible synchronization signals, described below in order to define further possible synchronization signals. Hence, according to some aspects, the method comprises detecting S11 that the number of cells and thereby also the number of required synchronization signals in the group is above a threshold. Then, the transmitting S13 is performed in response to the detecting S11.

However, it is also possible to only provide information defining a set of possible synchronization signals by transmitting S13 information defining a set of possible synchronization signals from the network node. Hence, the network node signals the information defining a set of possible synchronization signals continuously, repeatedly or when the information has changed. The principle remains the same and will now be described.

The method comprises obtaining S12 information defining a set of possible synchronization signals of cells in the group 100. In other words, information is collected regarding the synchronization signals that are used in the group of cells, or about which synchronization signals that the cells in the group are allowed to use. This information may be obtained in different ways. It may be dynamically obtained or it may be pre-programmed in the network node 110.

The method further comprises transmitting S13 the obtained information in the first cell 110*a*. The transmission may be a unicast, a multicast or a broadcast. Typically a physical control channel, such as the Physical Downlink Control Signal, PDCCH, is used. Then, the wireless device can receive the information and use it when synchronizing to the network as described in connection with step 2*a* above.

According to some aspects, the set of possible synchronization signals is a subset of a set of predefined synchronization signals. By limiting the number of possible sequences, the synchronization signal space is narrowed down as discussed above.

According to some aspects, the information defines synchronization signals used by cells in the group 100. If possible, the network node may transmit information defining the synchronization signals that are actually in use in the group of cells. However, this information may not always be available, because it may change over time. Then it may require receiving S12*a* information from network nodes 110 defining further cells in the group 100. In other words, the groups in the cell may inform each other about the currently used synchronization signals. The use of synchronization signals may also be controlled by the core network. According to some aspects, the obtaining S12 comprises receiving S12*b* information from a core network.

An alternative to informing about the synchronization signals that are actually used is to provide information that defines synchronization signals that the cells in the group 100 are allowed to use. If there are groups of synchronization signals having good correlation properties, as discussed above, then the information may comprise information about the group of synchronization signals that are allowed in the group of cells. Such information may be pre-programmed or standardized.

Figure 5:
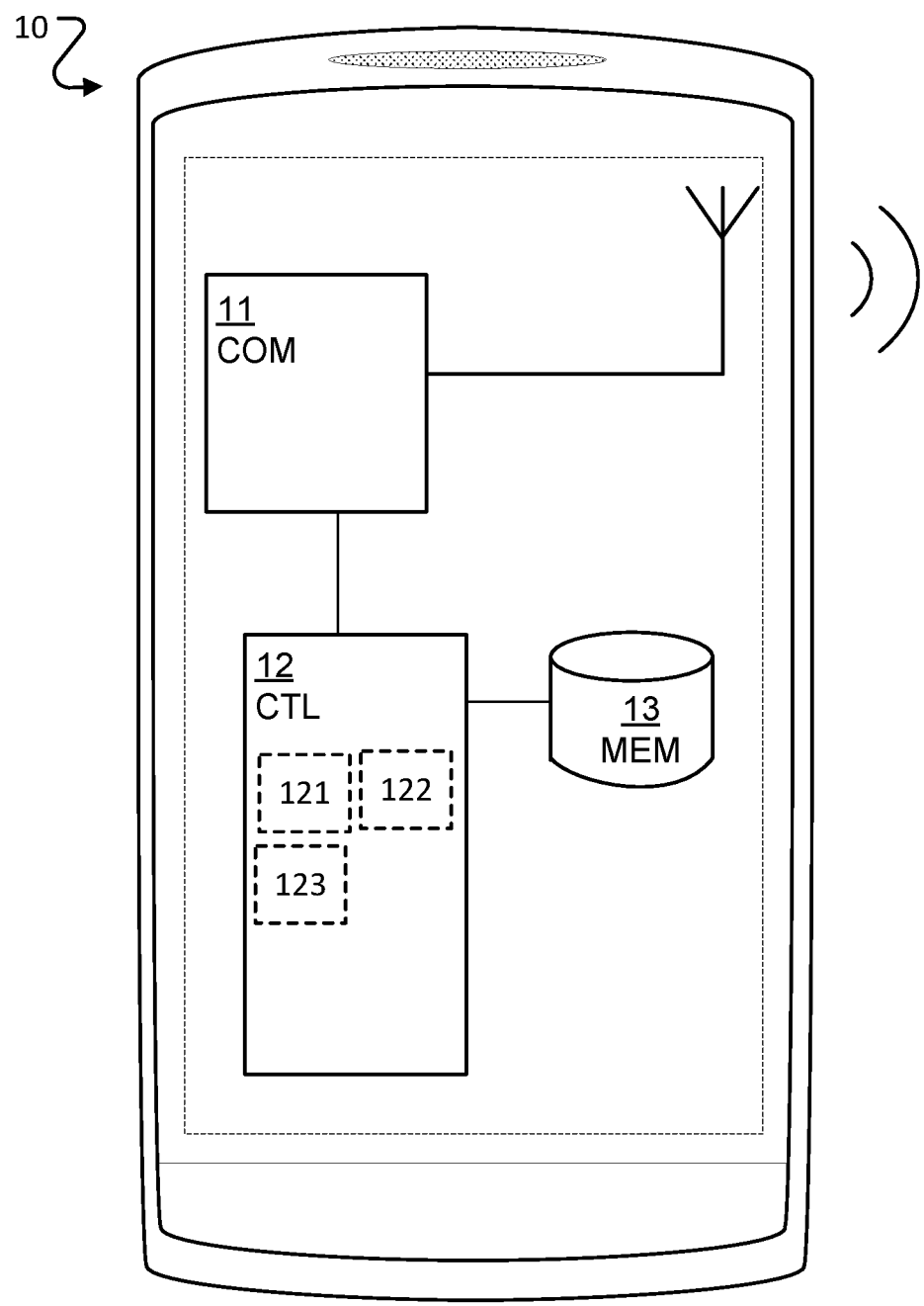
FIG. 5 illustrates an example wireless device, according to some of the example embodiments.

FIG. 5 illustrates an example wireless device, according to some of the example embodiments, wherein the wireless device is configured for cell detection within a group 100 of cells which may incorporate some of the example wireless device operation embodiments discussed above or below. As shown in FIG. 5, the wireless device 10 may comprise a radio communication interface 11 configured to receive and transmit any form of communications or control signals within a network. It should be appreciated that the radio communication interface 11 may be comprised as any number of transceiving, receiving, and/or transmitting units or circuitry. It should further be appreciated that the radio communication interface 11 may be in the form of any input/output communications port known in the art. The radio communication interface 11 may comprise RF circuitry and baseband processing circuitry (not shown).

The wireless device 10 may further comprise at least one memory unit or circuitry 13 that may be in communication with the radio communication interface 11. The memory 13 may be configured to store received or transmitted data and/or executable program instructions. The memory 13 may also be configured to store any form of beam-forming information, reference signals, and/or feedback data or information. The memory 13 may be any suitable type of computer readable memory and may be of volatile and/or non-volatile type. According to some aspects, the disclosure relates to a computer program comprising computer program code which, when executed in a first wireless device, causes the first wireless device to execute any aspect of the example node operations described above.

The wireless device 10 may further comprise further processing circuitry 12 which may be configured to cause the wireless device 10 to detect a first synchronization signal of a first cell 110*a* in a group 100 of cells, wherein the detecting S1 comprises searching for any of a set of predefined synchronization signals. The processing circuitry 12 is further configured to obtain, based on the detected first synchronization signal, information defining a subset of the predefined synchronization signals, wherein the subset defines synchronization signals that are possible within the group 100 of cells. The processing circuitry 12 is also configured to decode one or more further synchronization signals of cells in the group 100 of cells using the obtained information.

The processing circuitry 12 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

According to some aspects the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

Hence, according to some aspects, the processing circuitry 12 comprises a detection module 121 configured to detect a first synchronization signal of a first cell 110*a* in a group 100 of cells, wherein the detecting S1 comprises searching for any of a set of predefined synchronization signals. The processing circuitry 12 further comprises an obtaining module 122 configured to obtain, based on the detected first synchronization signal, information defining a subset of the predefined synchronization signals, wherein the subset defines synchronization signals that are possible within the group 100 of cells. The processing circuitry also comprises a decoding module 123 configured to decode one or more further synchronization signals of cells in the group 100 of cells using the obtained information.

Figure 6:
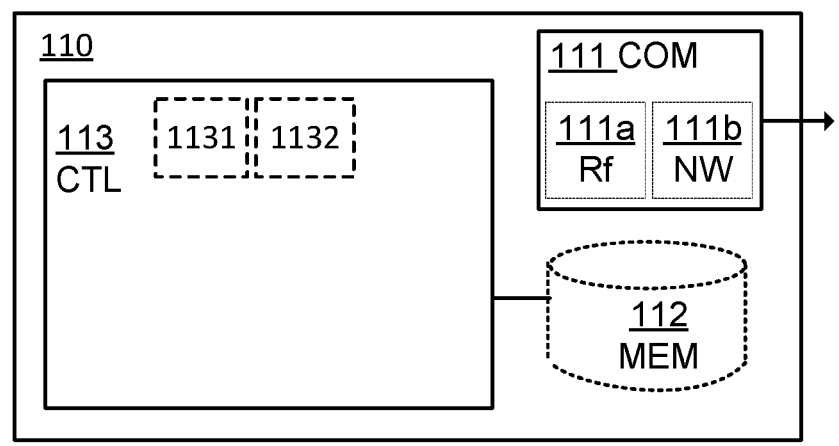
FIG. 6 illustrates an example network node, according to some of the example embodiments.

FIG. 6 illustrates an example network node 110, according to some of the example embodiments, defining a first cell 110*a* and configured to assist cell detection in the group 100 of cells, using a wireless device 10. The network node 110 is typically a radio network node or base station, such as an eNodeB in LTE. The network node 110 comprises communication interface 111 configured for communication with a wireless device 10. The communication interface 111 comprises a radio communication interface 111*a* and a network communication interface 111*b*. The network node 110 further comprises a memory 112 and processing circuitry 113.

The radio communication interface 111*a* is configured for communication with wireless devices within reach of the network node over a radio communication technology.

The network communication interface 111*b* is configured for communication with other network nodes. This communication is often wired e.g. using fiber. However, it may as well be wireless. The connection between network nodes is generally referred to as the backhaul.

The controller, CTL, or processing circuitry 113 may be constituted by any suitable Central Processing Unit, CPU, microcontroller, Digital Signal Processor, DSP, etc. capable of executing computer program code. The computer program may be stored in a memory, MEM 112. The memory 112 can be any combination of a Random Access Memory, and a Read Only Memory, ROM. The memory 112 may comprise persistent storage, which, for example, can be any single one or combination of magnetic memory, optical memory, or solid state memory or even remotely mounted memory.

According to some aspects, the disclosure relates to a computer program comprising computer program code which, when executed, causes a network node to execute the methods described above and below.

The processing circuitry 113 is configured to perform the proposed methods of assisting cell detection in a group 100 of cells. Hence, the processing circuitry 113 is configured to obtain S12 information defining a set of possible synchronization signals of cells in the group 100. The processing circuitry 113 is further configured to transmit S13 the obtained information in the first cell 110*a*.

According to some aspects the processing circuitry 113 comprises modules configured to perform the methods described above. The modules are implemented in hardware or in software or in a combination thereof. The modules are according to one aspect implemented as a computer program stored in a memory 112 which run on the processing circuitry 113.

Hence, according to some aspects, the processing circuitry 113 comprises an obtaining module 1131 configured to obtain S12 information defining a set of possible synchronization signals of cells in the group 100. The processing circuitry 113 further comprises a transmitting module 1132 configured to transmit S13 the obtained information in the first cell 110*a*.

According to some aspects, the subset of possible synchronization signals is a subset of a set of predefined synchronization signals. After a successful PCI reading, and cell synchronization thereof, relating to an initial access of a wireless device to a network, the wireless device can acquire the PCI group information. The group information constitutes a set of possible synchronization signals that is a subset of a set of predefined synchronization signals, which narrows down the synchronization signal space for blind decoding.

According to some aspects, the information defines synchronization signals used by cells in the group 100. According to some aspects, the information defines synchronization signals the cells in the group 100 are allowed to use.

Aspects where the information defines synchronization signals used or are allowed to be used by the cells in the group 100 have been discussed above in relation to aspects of the method of assisting cell detection, with all the associated advantages.

Figure 7:
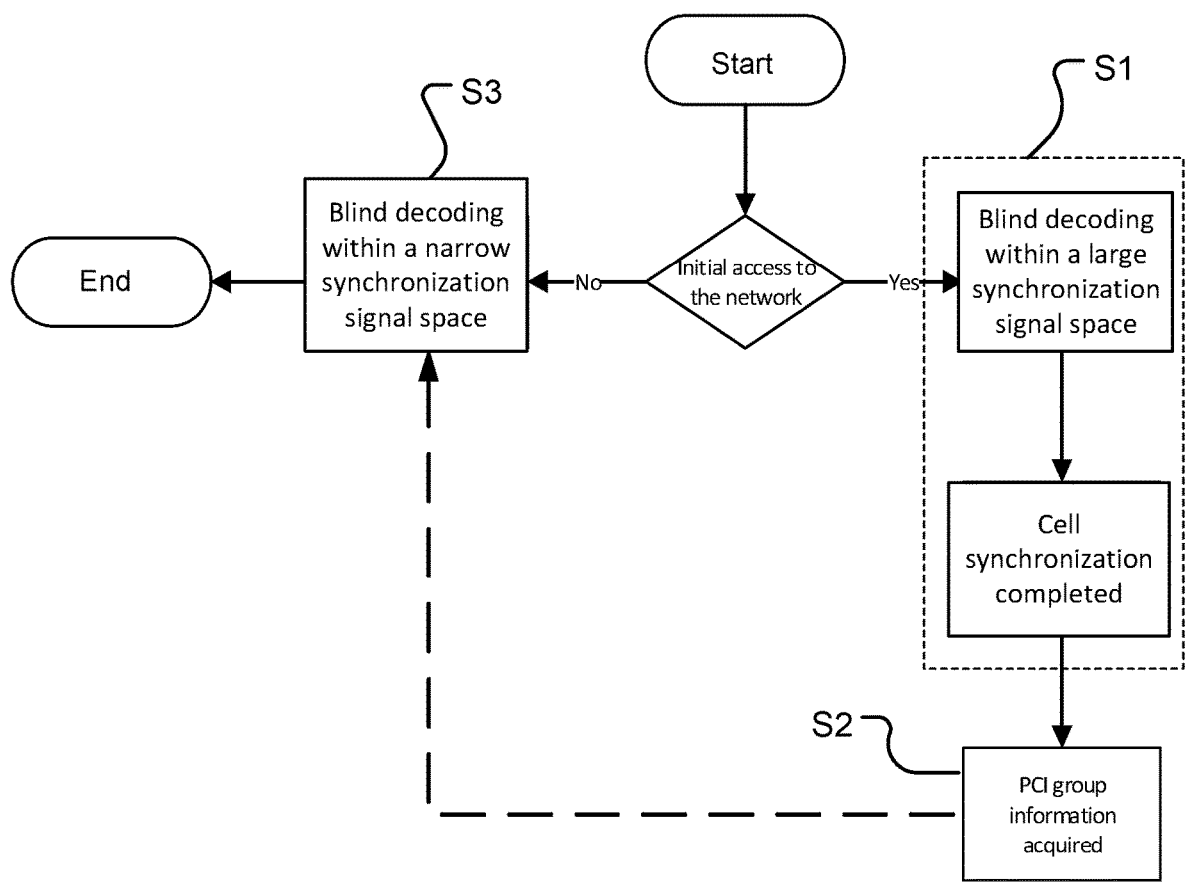
FIG. 7 is a flowchart illustrating an embodiment of the method for cell detection within a group of cells.

FIG. 7 is a flowchart illustrating an embodiment of the method for cell detection within a group of cells. The method "Start" by a UE making an initial attempt to access the network. Then the UE detects, step S1 as discussed in relation to FIG. 3, a first synchronization signal of a first cell 110*a* in a group 100 of cells. This is done by blind decoding within a large synchronization space. Hence, at the initial access/camping to the network, a UE decodes cell synchronization signals with rather relaxed requirements in terms of time to decode PCI and other related cell information thereof (e.g. reference symbol pattern). For instance, several blind decoding attempts may be acceptable at the first-time network access if there are detectable signals formed with different PCI group(s) than the local C-MTC cells. Then cell synchronization is completed.

Then, the UE obtains S2 information defining a subset of the predefined synchronization signals based on the detected first synchronization signal, wherein the subset defines synchronization signals that are possible within the group 100 of cells.

After a successful PCI reading (and cell synchronization thereof) at the initial network access, the UE can acquire the PCI group information which narrows down the synchronization signal space for blind decoding.

Subsequent synchronization is e.g. performed after power off or at cell re-selection. This comprises decoding S3 one or further synchronization signals of cells in the group 100 of cells using the obtained information. Blind decoding is performed within the narrowed synchronization signal space.

Within the context of this disclosure, the terms "wireless terminal" or "wireless device" encompass any device which is able to communicate wirelessly with another device, as well as, optionally, with an access node of a wireless network by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

The invention claimed is:

1. A method, performed in a wireless device, for cell detection within a group of cells, the method comprising:
    detecting a first synchronization signal of a first cell in the group, wherein the detecting comprises searching for any of a set of predefined synchronization signals, wherein detecting the first synchronization signal comprises applying a filter for each predefined synchronization signal until a match is found;
    obtaining, based on the detected first synchronization signal, information defining a subset of the predefined synchronization signals, wherein the subset defines synchronization signals that are possible within the group of cells; and
    decoding one or more further synchronization signals of cells in the group of cells using the obtained information that includes the subset of the predefined synchronization signals distinguishable from one another than signals within other groups, wherein decoding one or more further synchronization signals comprises applying a filter for each possible synchronization signal in the subset until a match is found.

2. The method according to claim 1, wherein the decoding of one or more further synchronization signals comprises searching for any of the possible synchronization signals.

3. The method according to claim 1, wherein the subset only comprises synchronization signals having correlation properties below a predefined threshold.

4. The method according to claim 1, wherein the information defines synchronization signals used by cells in the group.

5. The method according to claim 1, wherein the information defines synchronization signals that the cells in the group are allowed to use.

6. The method according to claim 1, wherein each synchronization signal comprises one or more codes or symbol sequences.

7. The method according to claim 1, wherein the obtaining comprises receiving information transmitted from a network node in the first cell or wherein the obtaining comprises obtaining information stored in the wireless device.

8. The method according to claim 1, wherein the group consist of cells located within an area, cells operated by one or more predefined operators or cells providing one or more predefined services.

9. The method according to claim 1, wherein the synchronization signals comprise a Physical Cell Identity.

10. A wireless device configured for cell detection within a group of cells, the wireless device comprising:
   a radio communication interface configured to communicate with a network node and processing circuitry configured to cause the wireless device;
      to detect a first synchronization signal of a first cell in the group, wherein the detecting comprises searching for any of a set of predefined synchronization signals, wherein detecting the first synchronization signal comprises applying a filter for each predefined synchronization signal until a match is found;
      to obtain, based on the detected first synchronization signal, information defining a subset of the predefined synchronization signals, wherein the subset defines synchronization signals that are possible within the group of cells; and
      to decode one or more further synchronization signals of cells in the group of cells using the obtained information that includes the subset of the predefined synchronization signals distinguishable from one another than signals within other groups, thereby to
      wherein decoding one or more further synchronization signals comprises applying a filter for each possible synchronization signal in the subset until a match is found.

11. The wireless device according to claim 10, wherein the decoding of one or more further synchronization signals comprises searching for any of the possible synchronization signals.

12. A method of assisting cell detection in a group of cells, wherein the method is performed in a network node defining a first cell in the group of cells, the method comprising:
   obtaining information defining a set of possible synchronization signals of cells in the group, wherein the set of possible synchronization signals is a subset of a set of predefined synchronization signals;
   detecting that the number of cells in an area is above a threshold; and
   transmitting the obtained information in the first cell, wherein the obtained information includes the subset of the predefined synchronization signals distinguishable from one another than signals within other groups, wherein transmitting the obtained information is performed in response to detecting that the number of cells in an area is above the threshold.

13. The method of claim 12, wherein the transmitting comprises transmitting dedicated control information to a wireless device.

14. The method of claim 13, wherein the transmitting comprises multicasting or broadcasting control information to several wireless devices.

15. The method of claim 12, wherein the information defines synchronization signals used by cells in the group.

16. The method of claim 12, wherein the information defines synchronization signals the cells in the group are allowed to use.

17. The method of claim 12, wherein the obtaining comprises receiving information from one or more network nodes defining further cells in the group.

* * * * *